(12) United States Patent
Plan

(10) Patent No.: US 7,103,158 B2
(45) Date of Patent: Sep. 5, 2006

(54) DYNAMIC INTERACTIVE VOICE ARCHITECTURE

(75) Inventor: Matthew Plan, Albany, CA (US)

(73) Assignee: Pacific Bell Information Services, San Ramon, CA (US)

( * ) Notice: Subject to any disclaimer, the term of this patent is extended or adjusted under 35 U.S.C. 154(b) by 152 days.

(21) Appl. No.: 10/084,176

(22) Filed: Feb. 28, 2002

(65) Prior Publication Data

US 2003/0161449 A1    Aug. 28, 2003

(51) Int. Cl.
H04M 1/64    (2006.01)
H04M 3/42    (2006.01)
G10L 21/06   (2006.01)

(52) U.S. Cl. .................. 379/88.23; 704/270; 455/414.1
(58) Field of Classification Search ............. 379/88.16, 379/88.18, 88.23, 88.17, 201.12, 88.11
See application file for complete search history.

(56) References Cited

U.S. PATENT DOCUMENTS

| | | | |
|---|---|---|---|
| 4,755,932 A * | 7/1988 | Diedrich .................. 379/88.16 |
| 5,255,305 A | 10/1993 | Sattar | |
| 5,488,650 A | 1/1996 | Greco et al. | |
| 5,737,393 A | 4/1998 | Wolf | |
| 5,771,276 A | 6/1998 | Wolf | |
| 5,852,809 A * | 12/1998 | Abel et al. ..................... 705/26 |
| 6,014,427 A | 1/2000 | Hanson et al. | |
| 6,014,428 A * | 1/2000 | Wolf ........................ 379/88.11 |
| 6,067,357 A | 5/2000 | Kishinsky et al. | |
| 6,122,345 A * | 9/2000 | Johnson .................... 379/88.23 |
| 6,212,178 B1 | 4/2001 | Beck et al. | |
| 6,259,444 B1 | 7/2001 | Palmer et al. | |
| 6,314,167 B1 | 11/2001 | Johnson | |
| 6,314,402 B1 | 11/2001 | Monaco et al. | |
| 6,321,198 B1 | 11/2001 | Hank et al. | |
| 6,366,658 B1 * | 4/2002 | Bjornberg et al. ........ 379/88.18 |
| 6,459,774 B1 * | 10/2002 | Ball et al. ................ 379/88.18 |
| 6,647,111 B1 * | 11/2003 | Bjornberg et al. ..... 379/220.01 |
| 6,718,017 B1 * | 4/2004 | Price et al. .............. 379/88.22 |
| 2002/0152197 A1 * | 10/2002 | Stocker et al. ................. 707/1 |

OTHER PUBLICATIONS

Levin et al., System And Method Fro A Spoken Language To A Large Database Of Changing Records, Aug. 7, 2003.*

A screen shot of an Internet website, entitled "Strata CS Integrated Voice Response Applications", at <http://www.toshiba/taistsd/stratacs_ivr.htm>, obtained no later than Dec. 20, 2001.

(Continued)

*Primary Examiner*—Gerald Gauthier
(74) *Attorney, Agent, or Firm*—Greenblum & Bernstein, P.L.C.

(57) ABSTRACT

A computer-based method implements a customized instance of a dynamic interactive voice system for a customer. The method includes configuring a call flow that incorporates multiple call flow nodes within a framework of a predetermined interactive voice response (IVR) application. The call flow nodes include different node types that are interchangeable with respect to call flow incorporation. The different node types include at least one standard node and at least one preprogrammed designer tool kit (DTK) module. The DTK modules include an application separate from the predetermined IVR application. The call flow is stored in association with an identification of the customer and activated in response to a call received at an IVR port associated with the customized instance. Configuring the call flow includes displaying at least one data field relating to a parameter of each call flow node at a display terminal and receiving data defining the parameter.

26 Claims, 4 Drawing Sheets

OTHER PUBLICATIONS

A screen shot of an Internet website, entitled "Interactive Voice Response (IVR)", at <http://www.toshiba.com/taistsd/ivr.htm>, obtained no later than Dec. 20, 2001.

A screen shot of an Internet website, entitled "Professional Voice-over for Telephone Systems", at <http://www.home.istar.ca/~talent/TVRprice.htm>, obtained no later than Dec. 20, 2001.

* cited by examiner

DYNAMIC INTERACTIVE VOICE ARCHITECTURE

BACKGROUND OF THE INVENTION

1. Field of the Invention

The present invention relates to the field of interactive voice response (IVR) services. More particularly, the present invention relates to configuring a dynamic interactive voice architecture (DIVA) based on customer needs without affecting the underlying computer programming.

2. Background Information

Telecommunications service providers offer interactive voice response (IVR) services that generally provide a series of automated voice menus corresponding to their customers' businesses, and execute additional menus or various applications in response to voice menu selections. For example, the applications may include prerecorded announcements or information, call transfers, automated transactions, and the like. An IVR service for a particular customer is accessible to callers dialing a telephone number assigned to the customer, connecting the caller to an IVR platform. The callers select options from the menus using the keypad of conventional dual-tone multi-frequency (DTMF) telephones. The callers navigate among the menus and applications until the service requests are complete, at which point the calls are terminated.

An IVR service offered by a telecommunications service provider is often called upon to handle automated applications from a variety of customer businesses. For example, the same service provider may provide IVR services for banks, hospitals and retail stores using the same IVR platform. In order to accommodate the needs of various customers, it is desirable for the service provider to appropriately tailor each IVR service application. Although conventional IVR services enable minor changes to the functionality, such as recording and changing actual voice announcements, more significant changes, such as adding and deleting menus, menu items and associated functionality, require alteration of the underlying source code used to program the IVR.

Changing the source code of an IVR to implement a new application is inefficient and generally undesirable. Such reprogramming requires the skills of an experienced, technically adept IVR programmer. Much of the source code of a new application duplicates preexisting source code, but any changes are developed from scratch and therefore untested. The modified source code thus requires testing and debugging before being placed in service, causing delay in implementation.

Conventional IVR services offer some limited solutions for limited customization. For example, an IVR service may access a variety of prepackaged programs that function based on applications separate from the IVR application. However, the prepackaged programs are ordinarily cannot be configured to operate within the same IVR application and cannot be modified short of reprogramming the IVR application source code or the prepackaged program source code. Again, such reprogramming requires a relatively labor intensive undertaking by the service provider to meet the customer's needs.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF EMBODIMENTS

Figure 1:
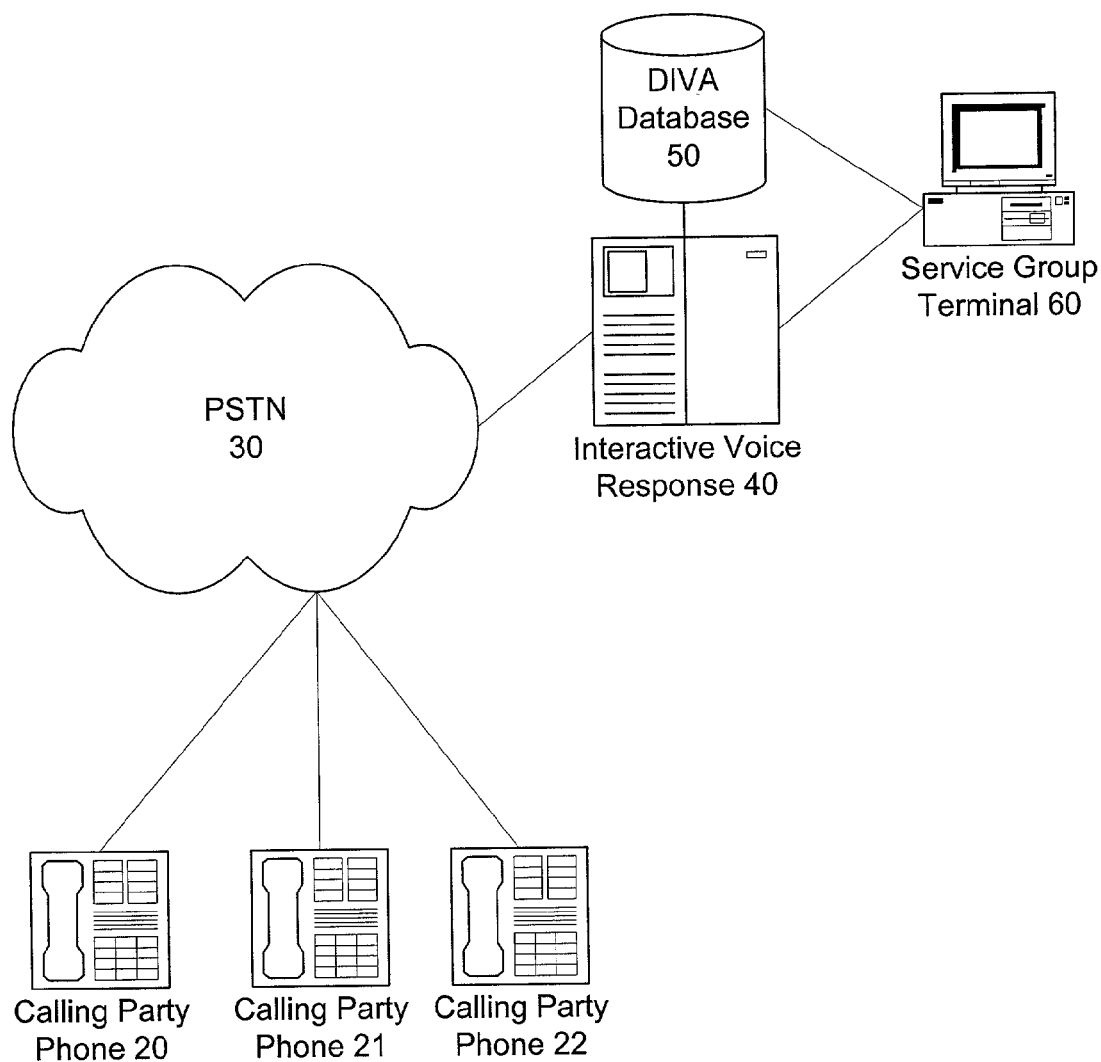
FIG. 1 is a block diagram showing an exemplary dynamic interactive voice service system, according to an aspect of the present invention.

The present invention relates to a flexible, yet reliable, IVR service provided by a telecommunications service provider to customers who rely on automated voice messaging to service their respective callers. The IVR service is enabled by dynamic interactive voice architecture (DIVA), which includes an IVR portion and a customer database portion. The IVR portion of the DIVA service is an underlying IVR application that is constant from one customer to the next, yet configurable by nonprogrammers (e.g., the service provider's service group personnel) to meet each customer's specific needs, relatively quickly and easily, using console menus displayed at a graphical user interface (GUI). The database portion stores the configuration specific to each customer, along with any associated customer data.

Each configuration in the DIVA service is referred to as an "instance," and includes a customer specific call flow that directs the underlying IVR application, without altering the source code on which the IVR application is based, along with the associated customer data. DIVA instances incorporate "nodes" to enable the customized call flows. The nodes are pre-designed and pre-preprogrammed building blocks that enable a call flow to incorporate information outside of the IVR application source code. Because the IVR application source code is not altered, standardization and reliability remain intact, thereby avoiding costly and time-consuming writing and debugging of modified source code. Furthermore, as indicated above, non-technical users, with little to no programming experience or knowledge, are able to configure the instances without changing the source code. Therefore, extensive training of technical personal is likewise avoided. Each instance is put into service and supported similarly to existing standard menu navigation IVR services.

In view of the above, the present invention through one or more of its various aspects and/or embodiments is presented to accomplish one or more objectives and advantages, such as those noted below.

An aspect of the present invention provides a method for implementing a customized instance of a dynamic interactive voice system for a customer. The method includes configuring a call flow that incorporates multiple call flow nodes within a framework of a predetermined interactive voice response application. The call flow nodes include different node types that are interchangeable with respect to call flow incorporation. The different node types include at least one standard node and at least one preprogrammed designer tool kit module, each designer tool kit module including an application separate from the predetermined interactive voice response application. The call flow is stored in association with an identification of the customer and activated in response to a call to a dialed number associated with the customized instance. At least one call flow node of the stored call flow is processed. The standard nodes may be a menu node, a transfer node, a vocabulary node or an end node. The designer tool kit modules may be an automatic attendant module or a names directory module.

The method for implementing the customized instance may further include displaying at least one data field relating to at least one parameter of each call flow node at a display terminal. The at least one parameter directs processing of the associated call flow node. Data defining the parameter is received from the display terminal. The parameter may include an identification number of a selected call flow node of the multiple call flow nodes to be processed after the at least one call flow node. An initial call flow node may be a menu node.

Another aspect of the present invention provides a method for configuring for a customer a customized instance of a dynamic interactive voice application without altering the underlying computer programming of the dynamic interactive voice application. The customized instance is executed in response to calls to a telephone number of the customer. The method includes storing multiple nodes executable by the dynamic interactive voice application, each node being one of multiple predetermined node types. The predetermined node types include at least one standard node type, included in the dynamic interactive voice application, and at least one feature specific node type, independent of the dynamic interactive voice application. A data field for each node is displayed at a GUI. The data field corresponds to a variable parameter associated with the node type of the node. Data is received by way of the GUI corresponding to the data field of each node, the data indicating a predetermined function to be performed by the corresponding node and establishing a call flow of the customized instance. The dynamic interactive voice application executes the predetermined function in accordance with the call flow regardless of the node type. The data entered in the data field of each node includes at least an identification number of a second node, indicating that the call flow proceeds to the second node.

The at least one node type may include a menu node type, a vocabulary node type or a transfer node type. The data entered in the data field of a menu node type includes an identification number of a second node, indicating that the call flow proceed to the second node when a caller selects a menu item number corresponding to the identification number of the second node. The data entered in the data field of the vocabulary node type includes a predetermined vocabulary tag to be spoken by a voice generator to a terminal of a caller. The data entered in the data field of a node from the transfer node type includes a transfer destination code. The at least one feature specific node type may include one of an auto attendant module, a names directory module, a call library module, a voice forms module and a zip code locator module.

Another aspect of the present invention provides a system for implementing a customized instance of a dynamic interactive voice system for a customer. The system includes a preprogrammed IVR application, a user terminal that enables assembly of a call flow associated with the customized instance, and a database that stores the call flow in association with at least one port of the IVR system. The call flow incorporates multiple call flow nodes within the IVR application, including multiple node types that are interchangeable for call flow incorporation. The different node types include at least one standard node and at least one preprogrammed designer tool kit module, each designer tool kit module including an application separate from the predetermined IVR application. The IVR system initiates the IVR application in response to an incoming call received at the IVR port and executes the call nodes as directed by the call flow associated with the IVR port in the database. The IVR port is associated with a telephone number of the customer, so that the incoming call is directed by a public switched telephone network (PSTN) to the appropriate IVR port based on calls to the customer telephone number.

Another aspect of the present invention provides a system for configuring for a customer a customized instance of a dynamic interactive voice application without altering the underlying computer programming of the dynamic interactive voice application, where the customized instance is executed in response to calls to a telephone number of the customer. The system includes an IVR system configured to execute a preprogrammed IVR application and a database that stores multiple nodes executable by the IVR application according to a call flow of the customized instance. Each node is one of multiple, predetermined node types, including at least one standard node type dependant on the IVR application and at least one feature specific node type independent of the IVR application. The system further includes a GUI that receives the nodes from the database and displays a data field for each node corresponding to a variable parameter associated with the node type of the node. The GUI receives data, input by a user, corresponding to the data field of each node. The data indicates a predetermined function to be performed by the corresponding node and establishing the call flow of the customized instance. The IVR application executes the predetermined function in accordance with the call flow regardless of the node type.

Another aspect of the present invention provides a computer readable medium for storing a computer program that controls configuration and operation of an IVR system for a customer according to a preprogrammed IVR application. The computer readable medium includes a configuration source code segment that enables configuring a call flow that incorporates multiple call flow nodes within a framework of the IVR application. The call flow nodes include different node types that are interchangeable in the framework of the IVR application. The different node types include at least one standard node and at least one preprogrammed designer tool kit module, each designer tool kit module including an application separate from the IVR application. The computer readable medium also includes a memory and an IVR source code segment. The memory stores the call flow in association with at least one port of the IVR system corresponding to a telephone number of the customer. The IVR source code segment retrieves the call flow from the memory in response to an incoming call to the at least one port and executes the IVR application as directed by the call flow.

The computer readable medium may further include an administrative source code segment that is initiated by an escape code received by the IVR source code segment through the incoming call. The administrative source code segment also enables additions, deletions and changes of an administrative variable associated with the call flow. The administrative variable may include a telephone extension number and/or a voice announcement.

Yet another aspect of the present invention provides a computer readable medium for storing a computer program that enables configuration for a customer of a customized instance of a dynamic interactive voice application without altering the underlying computer programming of the dynamic interactive voice application. The computer readable medium includes a storing source code segment and an interfacing source code segment. The storing source code segment stores multiple nodes executable by the dynamic interactive voice application. Each node is one of multiple predetermined node types, including at least one standard node type included in the dynamic interactive voice application and at least one feature specific node type independent of the dynamic interactive voice application. The interfacing source code segment displays a data field for each node at a display terminal. The data field corresponds to a variable parameter associated with the node type of the node. The interfacing source code segment further receives data through the display terminal corresponding to the data field of each node, the data indicating a predetermined function to be performed by the corresponding node and establishing a call flow of the customized instance. The dynamic interactive voice application executes the predetermined function in response to an incoming call to a telephone number of the customer in accordance with the call flow, regardless of the node type.

The various aspects and embodiments of the present invention are described in detail below.

FIG. 1 is a block diagram depicting an exemplary data network enabling the present invention, which includes an IVR 40 and a DIVA database 50. The IVR 40 is preprogrammed with the DIVA IVR application and may be, for example, a Periphonics VPS-IS 7500 or VPS-IS 9500, available from Nortel Networks. The DIVA database 50 is accessible by telecommunications service provider personnel from the service group terminal 60, and may be internal to the IVR 40. In an embodiment of the invention, the connection between the service group terminal 60 and the database 50 and/or the IVR 40 are networked through, for example, a packet switched data network, such as a transmission control protocol/internet protocol (TCP/IP) network. Of course, any compatible databases, including memory internal to the IVR 40 or a staging IVR operating separately from the IVR 40, having sufficient capability to implement the invention may be incorporated. In an embodiment of the invention, each customer has a segregated database within the DIVA database 50.

A service group user interacts with the DIVA service network by way of the service group terminal 60. In one embodiment, the service group terminal 60 is a menu driven interface with a display, implemented, for example, with an IBM Pentium based personal computer, running the Microsoft Windows or UNIX operating system. The service group terminal 60 displays a series of screens, enabling the user to log in, select or create customer accounts, create and modify call flows, generate usage reports and the like. The log-in may include pre-assigned identification data specific to a service representative, such as an identification number and a password, to appropriately restrict access to the customers' DIVA service accounts.

Figure 2:
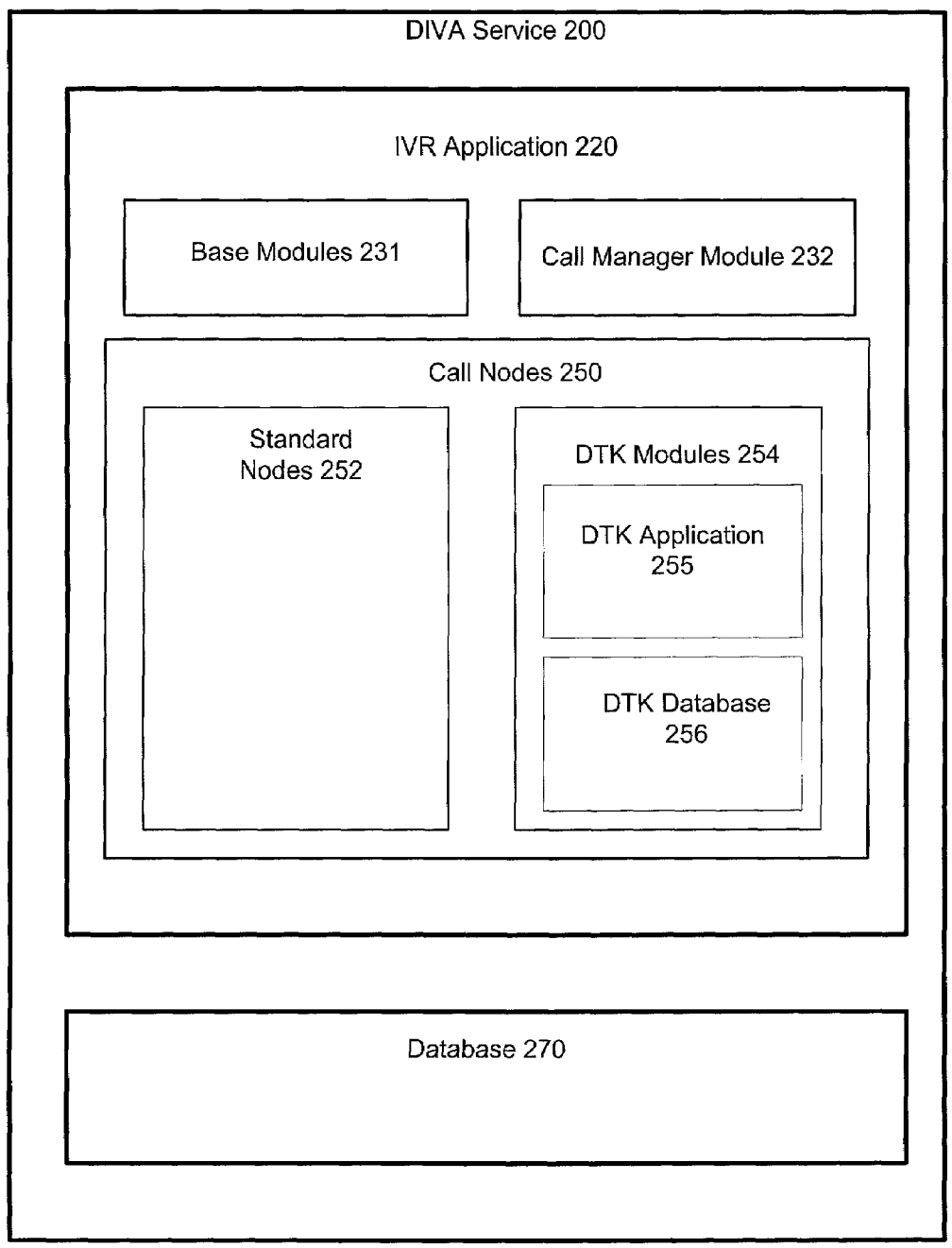
FIG. 2 is a block diagram showing exemplary architecture for implementing the DIVA service, according to an aspect of the present invention.

FIG. 2 is a block diagram showing an exemplary software and data architecture for implementing the DIVA service 200. As stated above, the DIVA service 200 includes an IVR portion and a database portion, which is reflected in the configuration of each customer-specific DIVA instance. Accordingly, FIG. 2 depicts an IVR application 220 and a database 270.

The IVR application 220 of the DIVA service 200 supports multiple DIVA instances. For example, a customer is assigned at least one telephone number by which callers to that customer's business may reach the IVR application 220. By dialing the customer's telephone number, a call reaches, for example, one phone line or port of the IVR 40 that corresponds to the customer's DIVA Instance. The telephone number may be a toll-free number, such as an 800 or an 888 telephone number. The calls are received, for example, from the caller telephones 20–22 through the PSTN. The caller telephones 20–22 are DTMF telephones capable of producing tones recognizable by the IVR 40.

The database 270 stores information relied upon generally by the DIVA service 200. For example, the database 270 stores a list of instances, along with the associated customers and IVR 40 port assignments. As described below, each instance has corresponding databases particular to the instance, which is separate from the database 270, in an embodiment of the invention.

In response to an incoming call, the DIVA service 200 launches the customized call flow of the instance associated with the IVR 40 port, which directs that IVR application 220 to interact with the caller accordingly. The telecommunications service provider is thus able to simultaneously provide customized automated voice services to numerous customers having varying businesses using a single IVR 40 and underlying IVR application 220.

Furthermore, the customers are able to make administrative level changes to their respective call flows and data by conventionally accessing the IVR application 220. In other words, the customer may call its own assigned telephone number from any DTMF telephone (e.g., the caller telephones 20–22), enter a pre-designated key combination (e.g., *#0), enter appropriate authentication information (e.g., identification number and password), and reach a series of administrative menus. The administrative changes are implemented at a high level, and do not involve reconfiguration of the associated customized call flow. For example, the customer's administrator may add, change or delete voice messages, alter opened/closed scheduling, change employee extension numbers and add, change or delete library materials and voice forms, discussed below.

Each DIVA instance incorporates certain base modules 231 and a call manager module 232. The base modules 231 include certain basic functionality, such as the initial greeting, rotary telephone test, business hours of operation and language menus, processed prior to the main customized call flow for an instance. In an embodiment of the invention, the base modules 231 are the same for every instance. Alternatively, the base modules 231 are configurable and selected functionality may be turned ON and OFF for the various customers. The base modules 231 are supported by the call manager module 232.

The functionality of the call manager module 232 operates based on the contents of configuration files that set various call limitations, such as annual holidays, hours of operation, emergency open/closed announcements, transfer—destination dial-strings or phone numbers. The configuration files accessed by the call manager module 232 further include maximum retries, maximum call time, global keys (e.g., which key callers must press to return to a previous menu), whether to speak a greeting and introductory announcement, whether to perform a rotary telephone test, and the like.

Through console menus, displayed for example at the service group terminal 60, a service group user sets customer announcements relating to annual holidays, hours of operation, emergency open/closed, temporary open/closed, and the like. Likewise, transfer-destination dial-strings or telephone numbers and tables that control other time-of-day processing are established. In an embodiment of the invention, the customers may update certain of the call manager module 232 options after the DIVA service 200 has been implemented using the administrative access through the IVR 40, as discussed above. The schedules of the call manager module 232 may not be invoked in every calling situation. For example, in a Centrex system, or through implementation of the auto attendant module, when an individual extension number is dialed, the main number is bypassed and the schedule data is irrelevant.

Each DIVA instance also incorporates a customized call flow that interrelates a series of call nodes 250. The call nodes 250 include two types: (i) nodes enabling typical core IVR functionality, such as menus, vocabulary prompts, transfer destinations and call termination, called standard nodes 252; and (ii) nodes enabling pre-designed, task specific developer's tool kit (DTK) applications, called DTK modules 254. The DTK modules 254 include, for example, an auto attendant module, a names directory module, a call library module, a voice forms module, a zip code locator module and any other definable, prepackaged voice interactive services that the telephone communications service provider wishes to offer its customers. In an embodiment of the invention, the standard nodes 252 further include links to external programs, such as alternative management information services (MIS) locations, to invoke functionality not otherwise supported by the DIVA service 200.

To facilitate explanation of the invention, each type of functionality accessible through the call nodes 250, including the standard nodes 252 and the DTK modules 254, are classified as "node types." Significantly, from an interfacing point of view, the node types are indistinguishable to the customized call flow of the instance, and ultimately the IVR application 220, regardless of the associated functionality.

With respect to the automated speech functionality, each instance may incorporate customized vocabulary, along with the vocabulary of the standard nodes 252 and DTK modules 254. English is the default language, but instances may be configured with many languages, e.g., five languages, chosen from a list of numerous available languages. The customer may supply the script for its instance to assure applicability to the customer's product or service. The voice files actually heard by the customer's callers are recorded through the administration process or through professional studio recording.

With respect to the standard nodes 252, the menu nodes serve as the basis for configuring and implementing the customized call flows. The menu nodes verbally present options to the caller to enable the automated interaction between the caller and the DIVA service 200. Each option listed in a particular menu corresponds to another node and includes an associated selection number. When the caller presses the number key on the DTMF telephone (e.g., via the calling party telephones 20–22) corresponding to a selection number, the call flow initiates processing of the associated node. The selected node may be another menu node, a transfer node, a vocabulary node, a link node, an end node or any one of the DTK modules 254.

In an embodiment of the invention, up to 999 nodes may be used as building blocks for any one instance. Typically, the menu nodes define the basic structure of the call flow and may extend to the full 999-node limit. As a customer's caller navigates through the call flow, the menus are processed and recorded in a stack having, for example, a maximum size of ninety-nine entries. The process thus enables the DIVA service 200 to recognize a caller's place in the call flow up to 99 levels at a time, as discussed in detail below.

The vocabulary nodes contain the voice messages played at predetermined intervals in the customized call flow. Each vocabulary node includes two files: a data file and an associated index file, stored in the database 270, for example, discussed below. The vocabulary prompts include standard vocabulary tags and customer specific vocabulary tags. The standard vocabulary tags are incorporated in the IVR application 220 and are generally common to all customized call flows. For example, a vocabulary node having the vocabulary tag "invalid entry" is called in response to an unrecognizable or improper key entry at a menu prompt and states, for example: "You have made an invalid entry. Please try again." A vocabulary node having the vocabulary tag "transfer failed" is called in response to a failed transfer attempt and states, for example: "I'm sorry. We are unable to connect you at this time. The line is either busy or there is no answer."

In an embodiment of the invention, the standard vocabulary tags also include standard announcements associated with the DTK modules 254. For example, a standard voice tag associated with the auto attendant module may include an "aa extension entry" vocabulary tag, the "aa" indicating auto attendant module, which states: "Enter the extension number you want now." A standard voice tag associated with the names directory module may include an "nd greeting" vocabulary tag, the "nd" indicating names directory module, which states: "The names directory allows you to locate personnel based on their name, and to transfer to their extension after locating their name." The functionality of the call manager module 232 likewise includes predefined, standard voice tags, although the call manager is not implemented as a specific node type. All of the standard vocabulary tags may be stored in a common vocabulary configuration file in the database 270 and associated with the corresponding node types.

The customer specific vocabulary tags are included in the customized call flow of a particular instance. Because the customer specific vocabulary tags are not predefined, the associated index information is more specific than simply identifying a previously assigned vocabulary tag index number. For example, each customer specific vocabulary tag includes a language prefix, a customer identification number and a call flow identification number for relating the vocabulary tag to a specific instance, and a node identification number and a node name for relating the vocabulary tag to a specific node. The substance of the customer specific vocabulary tag is created according to a script using any known methodology, including voice recording and text-to-speech voice generation. The customer specific voice tags are stored in a separate vocabulary file and, in an embodiment of the invention, can be included in a vocabulary report for the customer, created and displayed, for example, at the service group terminal 60.

The administrative functionality of the DIVA service 200 includes a routine that enables the customer to update the vocabulary tags. The customer's administrator uses a list of the standard vocabulary tags and a call flow report, which indicates the vocabulary tag index numbers and the nodes with which the vocabulary tags are respectively associated. For example, the standard vocabulary tag index numbers may start at 1000. In order to update a standard vocabulary tag, the caller enters a number greater than 1000, which enables access to the respective index of the vocabulary configuration file to determine the associated standard vocabulary tag to be changed.

The transfer destination nodes are pre-defined in the customized call flow. Therefore, the customer cannot add them through IVR administrative access. Likewise, new transfer destinations must be implemented in the customized call flow by the service group personnel, and are then available to be maintained through the IVR. Similarly, the customer may only use the IVR to adjust the open/closed hours for the schedules that have already been included in the design and implemented in the customized call flow.

As stated above, additional node types available as building blocks for the customized call flows are the DTK modules 254. Each of the DTK modules 254 is conceptually similar to the overall DIVA service 200, except on a narrower scale. In particular, each of the DTK modules 254 includes an IVR portion, the DTK application 255 and associated source code, which is not changed from one configuration to the next, and a database portion, the DTK database 256. The IVR portion and the database portion are configurable by nonprogrammers (e.g., the service group personnel) within the confines of the existing source code to address the particular needs of each customer. The DTK modules 254 are pre-designed to address select functionality that is anticipated to be in demand by multiple customers. In an embodiment of the invention, the database 256 is separate from the DIVA service database 270, for example, and defines customer data files within the separate database.

One example of a DTK module 254 is the auto attendant module, which automatically transfers calls to an extension dialed by the caller. Conventionally, the dialed digits correspond to an extension on the customer's Centrex or PBX telephone system. The extensions are 3 to 5 digit numbers, for example. In an embodiment of the invention, the auto attendant module includes at least two optional functions beyond the basic extension routing: validation of the entered extension against a database of extensions and translation of the entered extension into an outside number. Both functions rely on an internal database of transfer phone numbers. For validation, a record entry in the database indicates that the extension is valid. For translation, an unused Centrex or PBX extension is translated to an outside number contained in the database record. The auto attendant module may also include an administrative function that allows customers to maintain their own database of extensions and transfer numbers. As described above with respect to the call manager, the auto attendant module performs call transfers regardless of whether the office is closed, allowing the customer's employees to receive calls after normal business hours or on holidays.

The names directory module interactively enables a caller to locate and connect to an extension of the customer's Centrex of PBX telephone system, for example, based on the letters of the desired party's name entered by way of the caller's DTMF telephone keypad. In an embodiment of the invention involving speech recognition, the caller may verbally recite the spelling of the name. After receiving a predetermined number of letters, the names directory module offers a list of matching names to the caller. The caller may then select the desired name, resulting in the names module transferring the call to the associated extension. As in the case of the auto attendant module, there is no time of day or other schedule related control on transfers under the names directory. A transfer will always be attempted to the extension in the list associated with the selected name.

Each name in the names directory listing is played using voice generation to spell the letters of the name or using prerecorded names in the person's own voice. Alternatively, the name can be played using text-to-speech if this facility is available. When text-to-speech is used, a phonetic version of each name may need to be included for the name to be pronounced correctly.

In an embodiment of the invention, the names directory module shares the same database as the auto attendant module. The shared database enables a customer having both applications to make a single administrative update to change extension information. Administrative routines further enable database and voice recordings maintenance.

The call library module allows a customer's caller to select and hear pre-established voice announcements and messages from a customer-maintained library. It also enables the configuration application to send faxes from a customer-maintained library of facsimile messages, which may correspond to the voice announcements. The call library module for a particular instance may be configured to have audio only, fax only or both types of call libraries, although the underlying call library module application source code retains the functionality of both, as described above. The functions of the call library fall in two areas: routines used by callers to select items to hear or receive by facsimile and administrative routines used by the customer to maintain the call library. In particular, appropriately authorized customers may call the DIVA service to add, change and delete audio and/or fax items and to receive a report of current call library items over the telephone.

In an embodiment of the invention, the call library module application routines play a title of each library item, tell its length in minutes and/or pages and allow the caller to select or bypass the item. The callers can rewind, backup, and end play with respect to the audio call library items. The call library module can be configured to allow callers to receive faxes in the same call, direct faxes to a different number or both. The callers may also select multiple faxes, which are sent in batches when directed to different numbers. In an embodiment of the invention, at least one port of the IVR 40 must be configured and associated with the customer's instance to enable outgoing faxes, whenever a call library module is included in the instance.

The voice forms module enables customers to define a collection of automated audio forms that are completed by a caller over a DTMF telephone, thereby collecting and organizing information from the caller. In particular, the voice form module identifies a collection of fields, each of which describes data to be collected from the caller. All fields should be introduced to the caller with a voice prompt describing the information the caller is to provide. The response from the caller can be a voice message, or numeric telephone keypad entry, depending on the definition of the field, although other types may be supported. A voice form response includes a set of responses to the corresponding fields of the form. The form responses are stored for later retrieval. The voice forms module operates based on the contents of database files directed to a particular instance. In an embodiment of the invention, multiple callers may access the same voice form concurrently.

The customer's administrator may then retrieve the responses left by the caller by calling into the DIVA service 200, listening to voice form responses and electively transcribing or deleting the information. The administrator may delete or leave a voice form response after listening to it. The administrator may also optionally respond to the form responses. While listening to a response, the administrator may advance through the fields of the form to obtain desired information more quickly. In other words, the voice fields may be played incrementally, that is, with incremental rewind, advance and pause, among the various fields. In an embodiment, a voice form field may be defined independently of a form, potentially resulting in multiple forms sharing a field.

The zip code locator module enables a customer's callers to find nearby customer locations based on the callers' respective zip codes. The functions of the zip code locator module fall in two areas: routines used by callers to identify locations and administrative routines used by the customer to maintain the zip code locator module. The call library module can be configured to allow callers to receive location information, be transferred to the identified locations (automatically or through DTMF selection), or both. The administrative routines enable the customers to maintain the zip code locator module without affecting the underlying source code, as discussed above. In other words, the customers are able to add, delete and modify locations using the administrative escape procedures over a DTMF telephone.

Each customized call flow created by the telecommunication service provider is stored in a customer-specific data file in a database. In an embodiment of the invention, each DIVA instance includes two directories and associated data: an active directory containing the active files and a staging directory containing inactive files. Both directories are able to fulfill the role of active or staging directory, so that when one directory is operating as the active directory, the other directory is the staging directory. When an instance is configured from the service group terminal 60, for example, data is accessed and files are affected in the staging directory so that the DIVA service 200 is not interrupted during configuration. Upon completion, the service group user may switch the directories, so that the staging directory becomes the active directory, immediately implementing the new or modified instance.

Figure 3:
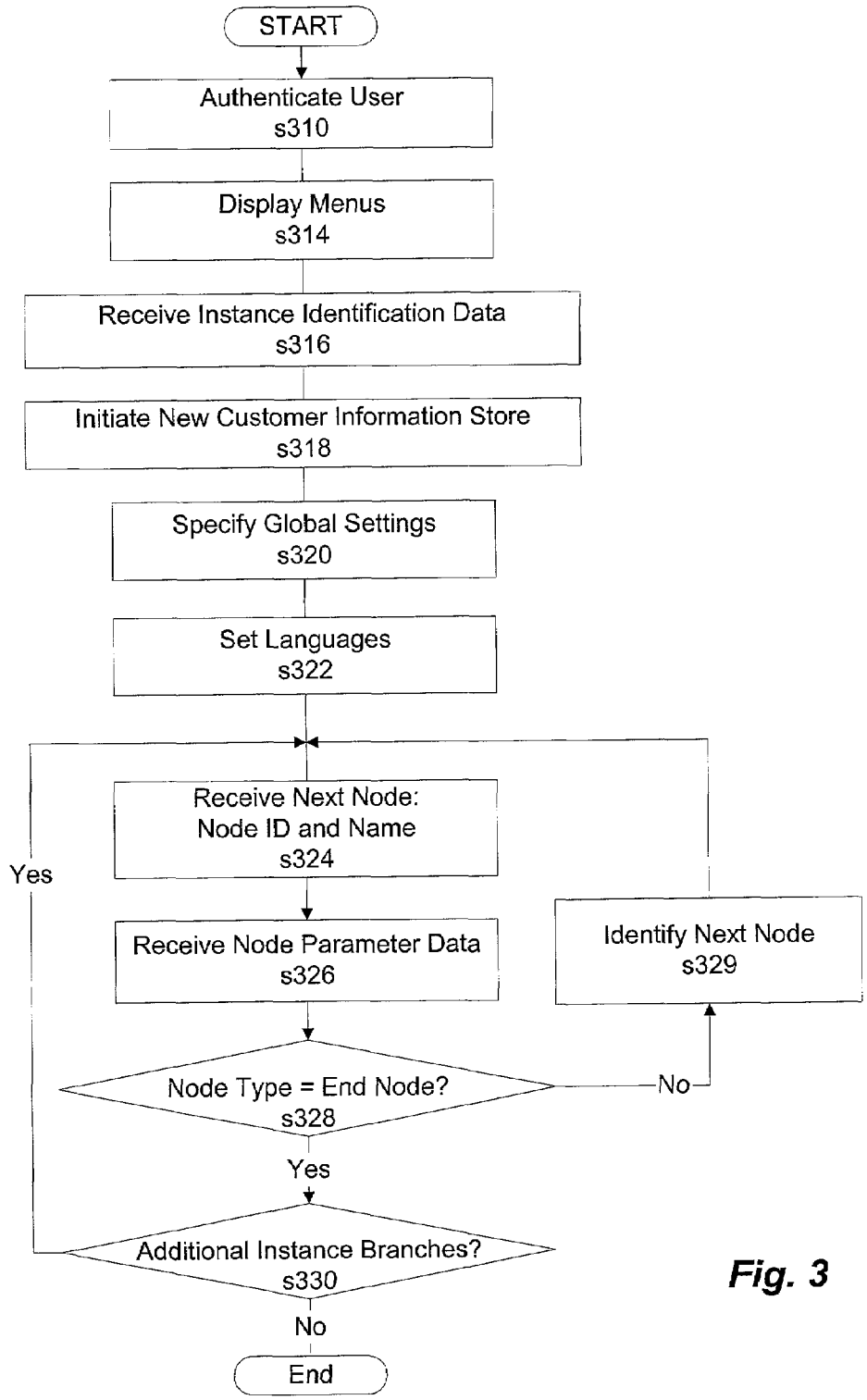
FIG. 3 is a flowchart depicting an exemplary configuration interaction to customize a DIVA instance based on customer specifications, according to an aspect of the present invention.

FIG. 3 is a flowchart depicting an exemplary interaction between the DIVA service 200 and a service group user in order to customize an instance based on customer specifications. A DIVA configuration application runs, for example, on a UNIX operating system. The service group user connects to the UNIX system through the service group terminal 60 and runs the configuration application. At step s310, the user is authenticated based on login information, including an identification number and/or a password.

After a successful authentication, a maintenance menu is displayed at the service group terminal 60 at step s314. In an embodiment of the invention, the maintenance menu includes four options: instances, line assignments, shared memory and exit. The instances option enables the user to access, create, modify and delete the customer specific instances. The line assignments option enables the user to assign an instance to a particular phone line or port of the IVR 40. The shared memory option enables the user to access stored data directly, e.g., without having to set up or otherwise access an existing instance. The exit options logs the user off of the configuration application.

In order to create a new instance, the user selects the instances option, which displays an instance menu. The instance menu includes several exemplary options related to customer instances, such as create instance, copy instance, edit instance, delete instance and reports, as well as a previous menu option to return the user to the maintenance menu, discussed above. In order to create a new instance, the user selects the create instance option. At step s316, identification information related to the instance is determined. For example, the user is prompted to enter a customer number, an application number and a brief description of the instance. In response, an information store is initiated at step s318 to service the newly created instance. The information store includes multiple customer database files associated with the nodes and the DTKs of the instance.

At step s320, the global settings are specified for the instance. The global settings include, for example, initial greetings and announcements, rotary tests on the calling party telephone, menu navigation instructions, maximum number of retries, maximum call time and the like. The user may elect to enter customized global settings or, in the alternative, simply incorporate the default global settings, which is done automatically for any global settings that are not altered by the user. The default settings, with corresponding descriptions, are kept in a configuration file located in the active directory, discussed above. For example, the global settings include speaking an initial greeting, performing a rotary telephone test, re-prompting a caller up to three times at any one menu and limiting total call time to 30 minutes.

At step s322, the languages are set through the console program at the service group terminal 60. In an embodiment of the invention, an instance may be configured to provide a selection of up to five languages, each of which is selected by the user from a universal set of optional languages. The selected languages may be entered in a string, for example, in the order in which they are to be presented to a caller.

Building the main customized call flow begins at step s324, which involves the structured implementation of the various nodes. A proper call flow has its nodes defined by the appropriate parameters and reachable by corresponding paths defined by a sequence of next nodes. The initial node is identified at step s324, which directly or indirectly ties in to all of the remaining nodes in the instance. To facilitate the call flow design, the configuration application enables the service group user to return to previous nodes during the configuration process. The node is identified at step s324 by a node ID number and/or a node name.

Different node types require different information relating to the corresponding pre-established node parameters, which is received at step s326. For example, each menu node automatically incorporates the global settings established at step s320 (e.g., 8 denotes return to the preceding menu, 0 denotes transfer to an extension or an attendant, * denotes return to the main menu and # denotes repeat of the current menu). Additional menu node data received at step s326 defines options other than the global options. For example, the service group user may determine that 1 denotes invoking another menu related to a specific service, 2 denotes playing a particular vocabulary tag and 3 denotes invoking a DTK module, such as the zip code locator module or the voice forms module, discussed above. The configuration application accordingly displays consecutive screens prompting the user to enter information regarding each of the parameters to be completed for the specified node type. With respect to menu nodes, in particular, the configuration application automatically generates consecutive node ID numbers associated with nodes identified as menu options, unless otherwise directed.

All node types, except for the end node type, include parameters that identify the next node to which the call flow proceeds. The end node type does not require this information because, by definition, the end node type marks the end of a call flow branch and/or the call flow itself. The other node types require entering data related to different associated parameters. For example, each vocabulary node type includes a vocabulary label from the call manager records, as well as a node ID number to which to link from the vocabulary node. Also, each DTK module requires a reference menu starting point that is initiated when the call flow is directed to a DTK module.

At step s328, the configuration application determines whether the current node type is an end node type. When it is not an end node type, the process proceeds to step s329 for the user to identify the next node to be executed in the call flow. The process returns to step s324, enabling the user to provide the node identification and parameter data for the new node. Steps s324 through s329 are repeated until an end node type is entered by the user, indicating the end of the call flow branch.

When the current node type is determined to be an end node at step s328, it is determined at step s330 whether the user intends to move on to create additional branches of the call flow. When additional branches are planned, the user may display a series of previous nodes to return to the node at which the branch occurred. Then, returning to step s324, the user may repeat the node definition process for the new branch until all nodes are entered and the call flow is complete. When the final end node has been established and no additional branches are to be created, as indicated at steps s328 and s330, respectively, the DIVA configuration application ends.

Upon completion, the integrity of the call flow may be checked in an embodiment of the invention based on a variety of reports generated by the configuration application. The reporting functionality is accessed from the reports option of the instance menu, discussed above. Any number of report types may be created and integrated with the DIVA configuration application. For example, a node report shows a sequential list of nodes that are displayed in node ID number order. An orphaned nodes report displays a list of nodes by node ID number that cannot be reached by any other node in the call flow. In other words, the nodes are identified that do not have parent nodes. A call flow report displays a listing of nodes (including node name or definition) that represent the actual flow of an incoming call, thereby enabling visualization of the call flow and indicating whether the call flow matches the customer's specification. The call flow report includes the touch-tone inputs that, when pressed, result in the caller reaching the associated node. All reports include identification of any node ID number associated with an incomplete node, such as an asterisk appearing next to a node ID number of an improperly defined node.

The remaining options of the instances menu address previously built and stored customer instances. The copy instance option enables the user to copy an entire instance to another data file. The user may then build a similar customer instance using much of the same call flow, saving a significant amount of time. Also, the user may copy the instance from the staging directory to the active directory, so that when the instance is activated (causing the staging directory to become the active directory and vice versa), both directories have identical information.

The edit instance option enables the user to access an existing instance and enter changes, such as adding, changing and deleting nodes, global functions and languages. When the edit instance option is selected, the configuration application directs the user to enter the necessary identification information to locate the desired node and parameter and to change them appropriately.

The delete instance option enables the user to remove an instance from the database 270 and the IVR 40. In an embodiment of the invention, the configuration application performs all deletion steps in response to the user simply identifying the customer instance to be deleted. The steps include, for example, unassigning phone lines of the IVR 40, deleting all extensions in the names directory, deactivating vocabulary, removing vocabulary files and deleting all transfer destinations, schedules and holidays in the call manager, and dump all associated databases.

Figure 4:
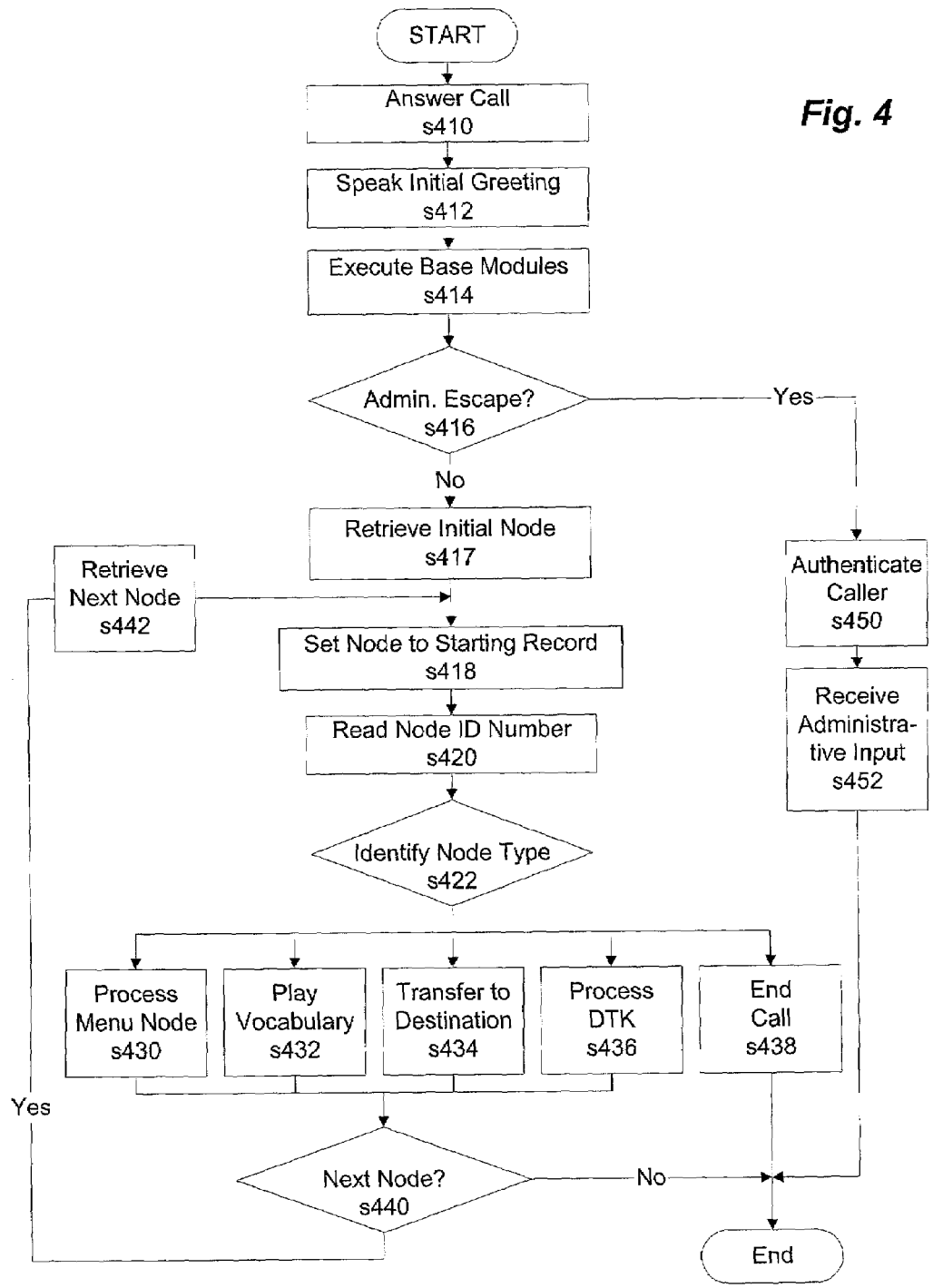
FIG. 4 is a flowchart depicting an exemplary interaction between a customer's caller and the DIVA service, according to an aspect of the present invention.

As described above, the new customized call flow may be implemented immediately. The call flow and associated customer data have been stored and are available to the IVR 40. FIG. 4 is a flowchart depicting an exemplary interaction between a customer's caller based on the customized call flow created by the service group user in accordance with FIG. 3.

At step s410 of FIG. 4, the IVR 40 answers the telephone call. Specifically, based on the number dialed by the caller, the call is directed through the PSTN 30 to a specific line or port of the IVR 40 previously assigned to the customer instance. Based on the line or port on which the call arrives, the IVR application 220 initiates the associated customized call flow. According to the call flow, an initial greeting is spoken to the caller at step s412 and the base modules 231 are executed at step s414. As discussed above, the base modules 231 include features common among different customers, such as open/closed messages, a rotary telephone test and a language menu, as supported by the call manager module 232. The instance may be configured to include or exclude any of the base modules 231, depending on the customer's requirements.

When the voice message of the first base module 231 is played, the caller has the opportunity to enter an administrative escape at step s416. In an embodiment of the invention, rather than responding to the menu presented in the base module 231, such as "press 1 if you have a touch tone phone" (i.e., the rotary telephone test), the caller may enter a pre-designated administrative escape code using the keys of the DTMF telephone, such as *#0 (star, pound, zero). When the customer instance does not include any base modules, there is simply a silent delay following the initial greeting at step s412, during which the caller may enter the administrative escape code.

The caller then leaves the main call flow and reaches an administrative security prompt. At step s450, the caller is authenticated as having administrative access based on an identification number and password entered by the caller. Once authenticated, the caller may make administrative level changes to the base modules 231 and the call nodes 250 using the keys of the DTMF telephone, voice instructions or a combination of both, at step s452. The administrative level changes include, for example, changing hours of operation, adding additional administrative level callers, recording new announcements and changing extension numbers of employees. The call is terminated upon completion of the administrative changes.

When no administrative escape code is received, the IVR application 220 retrieves the initial node at step s417 and sets the node as the starting record according to the customized call flow at step s418. The node identification number is read at step s420 and the node type is identified at step s422. The IVR application 220 then executes the identified node according to the associated node parameters and the semantics of the particular node type. In particular, depending on the node type, the IVR application 220 will process a menu according to a menu node at step s430, play a vocabulary tag according to a vocabulary node at step s432, transfer the call to an extension or other call destination according to a transfer to destination node at step s434 or process one of the DTK modules 254 according to the associated DTK module application 255 at step s436. When the node type is determined to be an end node type at step s438, the call is terminated accordingly. Depending on the call flow, a terminating voice tag, such as "Thank you for calling, goodbye," is played to the caller prior to ending the call.

When the node type is not an end node, the call flow determines whether a subsequent node has been identified during execution of the current node. For example, a menu node may present the caller with four options: 1—transfer to an extension, 2—access a names directory, 3—receive information from the customer and 4—end the call. When the caller selects the transfer option, the call flow determines that there is a next node at step s440, which is retrieved at step s442. The call flow then repeats steps s418 through s422 to set the next node to the starting record and to determine the next node ID number and type. In this example, the next node type is a transfer to destination node.

Similarly, when the caller selects the names directory option, the call flow determines that there is a next node at step s440 and that the next node type is a names directory DTK module at step s422 (after executing steps s442, s418 and s420). The names directory DTK module is then executed at step s436. When the caller selects the end call option, the call flow determines that there is a next node at step s440 and that the next node type is an end node at step s422 (after executing steps s442, s418 and s420), which accordingly ends the call through step s438.

The selected option may also direct the call to another menu node, which is processed in essentially the same manner. For example, when the caller selects the information option, the call flow determines that there is a next node at step s440, retrieves the next node at step s442, sets the next node to the starting record at step s418, reads the next node ID number at step s420 and determines that the next node type is another menu node at step s422. The new menu node is processed at step s430 and may present more specific options for the caller to receive information directly from a variety of vocabulary nodes or to invoke a call library DTK module to access information by facsimile, for example. The process is repeated until an end node is reached by the caller, either by selection through a menu node or automatically at the end of a call flow branch.

In an embodiment of the invention, when a menu node is executed, the associated menu node ID number is entered in a stack, enabling the caller to return to previous menus by pressing a predetermined previous menu key on the DTMF telephone. In particular, as each menu node is encountered by the application, the corresponding menu node ID number is compared to the menu node ID numbers in the stack. When the menu node ID number is not found in the stack, it is added to the top of the stack. When the menu node ID number is found in the stack, all menu node ID numbers above it are removed from the stack. Therefore, when the previous menu key is pressed, then the last menu node ID number is removed from the stack and used as the next node at step s318 to present to the caller. Successive previous menu key entries continue to remove menu node ID numbers from the stack, unwinding through the previous selections. The process stops when the last item is removed from the stack, indicating that the caller has returned to the top (i.e., the initial or main menu). Accordingly, the application unwinds properly even when a common menu node has been reached during the course of the call by more than one path. It also correctly handles a loop condition, in which the caller goes through the same menu node more that once. The instance may similarly include a predetermined main menu key, which is implemented by setting the next node ID number to the bottom (first) menu node ID number and clearing the rest of the stack.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

What is claimed is:

1. A method for implementing a customized instance of a dynamic interactive voice system for a customer, the dynamic interactive voice system having a database, the method comprising:
  configuring a call flow that incorporates a plurality of call flow nodes of different node types, the different node types comprising a plurality of standard nodes and a plurality of preprogrammed designer tool kit modules, each designer tool kit module having its own a database that is separate from the dynamic interactive database, at least one of the designer tool kit modules being a call library application, at least one of the designer tool kit modules being a zip code locator module, and at least one of the designer tool kit modules being a voice forms module;
  storing the call flow in association with an identification of the customer;
  activating the stored call flow in response to a call to a dialed number associated with the customized instance; and
  processing at least one call flow node of the stored call flow.

2. The method for implementing the customized instance according to claim 1, in which configuring the customer call flow further comprises:
 displaying at least one data field relating to at least one parameter of each call flow node at a display terminal, the at least one parameter directing processing of the associated call flow node; and
 receiving data defining the at least one parameter from the display terminal.

3. The method for implementing the customized instance according to claim 2, in which the at least one parameter comprises an identification number of a selected call flow node of the plurality of call flow nodes to be processed after the at least one call flow node.

4. The method for implementing the customized instance according to claim 3, in which an initial call flow node of the plurality of call flow nodes comprises a menu node.

5. The method for implementing the customized instance according to claim 1, in which the standard node comprises one of a menu node, a transfer node, a vocabulary node and an end node.

6. The method for implementing the customized instance according to claim 1, in which the designer tool kit module comprises one of an automatic attendant interactive voice response functionality and a names directory interactive voice response functionality.

7. The method of claim 1, in which each designer tool kit module has different tools for different audiences.

8. A method for configuring for a customer a customized instance of a dynamic interactive voice application without altering the underlying computer programming of the dynamic interactive voice application, the customized instance being executed in response to calls to a telephone number of the customer, the method comprising:
 storing a plurality of nodes executable by the dynamic interactive voice application, each node of the plurality of nodes being one of a plurality of predetermined node types comprising at least one standard node type included in the dynamic interactive voice application and a plurality of preprogrammed feature specific node types, at least one of the feature specific node types being a call library application that allows a caller to access pre-established messages from a customer maintained library, and at least one of the feature specific node types being a zip code locator module;
 displaying a data field for each node at a graphical user interface, the data field corresponding to a variable parameter associated with the node type of the node; and
 receiving data via the graphical user interface corresponding to the data field of each node, the data indicating a predetermined function to be performed by the corresponding node and establishing a call flow of the customized instance, the dynamic interactive voice application executing the predetermined function in accordance with the call flow regardless of the node type.

9. The method for configuring the customized instance of a dynamic interactive voice application according to claim 8, in which the data entered in the data field of each node comprises at least an identification number of a second node of the plurality of nodes, indicating that the call flow proceeds to the second node.

10. The method for configuring the customized instance of a dynamic interactive voice application according to claim 8, the at least one node type comprising one of a menu node type, a vocabulary node type and a transfer node type.

11. The method for configuring the customized instance of a dynamic interactive voice application according to claim 10, the data entered in the data field of a node from the menu node type comprising an identification number of a second node of the plurality of nodes, indicating that the call flow proceed to the second node when the a caller selects a menu item number corresponding to the identification number of the second node.

12. The method for configuring the customized instance of a dynamic interactive voice application according to claim 10, the data entered in the data field of a node from the vocabulary node type comprising a predetermined vocabulary tag to be spoken via a voice generator to a terminal of a caller.

13. The method for configuring the customized instance of a dynamic interactive voice application according to claim 10, the data entered in the data field of a node from the transfer node type comprising a transfer destination code.

14. The method for configuring the customized instance of a dynamic interactive voice application according to claim 8, the feature specific node type comprising one of an auto attendant interactive voice response functionality, and a names directory interactive voice response functionality.

15. The method of claim 8, in which each feature specific node type has different tools for different audiences.

16. A system for implementing a customized instance of a dynamic interactive voice system for a customer, the system comprising:
 an interactive voice response (IVR) system comprising a preprogrammed IVR application;
 a user terminal that enables assembly of a call flow associated with the customized instance, the call flow incorporating a plurality of call flow nodes within the IVR application, the plurality of call flow nodes comprising a plurality of node types that are interchangeable for call flow incorporation, the different node types comprising at least one standard node and a plurality of preprogrammed designer tool kit modules, each designer tool kit module having its own database, at least one of the designer tool kit modules being a zip code locator module, and at least one of the designer tool kit modules being a voice forms module; and
 a database that stores the call flow in association with at least one port of a plurality of ports of the IVR system;
 the IVR system initiating the IVR application in response to an incoming call received at the at least one port and executing the plurality of call nodes as directed by the call flow associated with the at least one port in the database.

17. The system for implementing the customized instance according to claim 16, the at least one port of the IVR system being associated with a telephone number of the customer, so that the incoming call is directed by a public switched telephone network to the at least one port based on calls to the customer telephone number.

18. The system of claim 16, in which each designer tool kit module has different tools for different audiences.

19. A system for configuring for a customer a customized instance of a dynamic interactive voice application without altering the underlying computer programming of the dynamic interactive voice application, the customized instance being executed in response to calls to a telephone number of the customer, the system comprising:
 an interactive voice response (IVR) system configured to execute a preprogrammed IVR application;
 a database that stores a plurality of nodes executable by the IVR application according to a call flow of the customized instance, each node of the plurality of nodes being one of a plurality of predetermined node types comprising at least one standard node type dependant on the IVR application and a plurality of preprogrammed feature specific node types, each feature specific node type having its own database, at least one of the feature specific node types being a call library application, at least one of the feature specific node types being a zip code locator module, and at least one of the feature specific node types being a voice forms module; and a graphical user interface that receives the plurality of nodes from the database and displays a data field for each node corresponding to a variable parameter associated with the node type of the node, the graphical user interface receiving data, input by a user, corresponding to the data field of each node, the data indicating a predetermined function to be performed by the corresponding node and establishing the call flow of the customized instance, the IVR application executing the predetermined function in accordance with the call flow regardless of the node type.

20. The system of claim 19, in which each feature specific node type has different tools for different audiences.

21. A computer readable medium for storing a computer program that controls configuration and operation of an interactive voice response (IVR) system for a customer according to a preprogrammed IVR application, the computer readable medium comprising:

a configuration source code segment that enables configuring a call flow that incorporates a plurality of call flow nodes within a framework of the IVR application, the plurality of call flow nodes comprising at plurality of different node types that are interchangeable in the framework of the IVR application, the plurality of different node types comprising at least one standard node and a plurality of preprogrammed designer tool kit modules, each designer tool kit module having its own database, at least one of the designer tool kit modules being a call library application, at least one of the designer tool kit modules being a zip code locator module, and at least one of the designer tool kit modules being a voice forms module;

a memory that stores the call flow in association with at least one port of the IVR system, which corresponds to a telephone number of the customer; and an IVR source code segment that retrieves the call flow from the memory in response to an incoming call to the at least one port and executes the IVR application as directed by the call flow.

22. The computer readable medium for storing the computer program according to claim 21, further comprising:

an administrative source code segment that is initiated by an escape code received by the IVR source code segment via the incoming call and that enables at least one of an addition, a deletion and a change of an administrative variable associated with the call flow.

23. The computer readable medium for storing the computer program according to claim 22, in which the administrative variable comprises one of a telephone extension number and a voice announcement.

24. The medium of claim 21, in which each designer tool kit module has different tools for different audiences.

25. A computer readable medium for storing a computer program that enables configuration for a customer of a customized instance of a dynamic interactive voice application without altering the underlying computer programming of the dynamic interactive voice application, the computer readable medium comprising:

a storing source code segment that stores a plurality of nodes executable by the dynamic interactive voice application, each node of the plurality of nodes being one of a plurality of predetermined node types comprising at least one standard node type included in the dynamic interactive voice application and a plurality of preprogrammed feature specific node types, each feature specific node type having its own database, at least one of the feature specific node types being a call library application, and at least one of the feature specific node types being a voice forms module; and an interfacing source code segment that displays a data field for each node at a display terminal, the data field corresponding to a variable parameter associated with the node type of the node, and that receives data via the display terminal corresponding to the data field of each node, the data indicating a predetermined function to be performed by the corresponding node and establishing a call flow of the customized instance, the dynamic interactive voice application executing the predetermined function in response to an incoming call to a telephone number of the customer in accordance with the call flow, regardless of the node type.

26. The medium of claim 25, in which each feature specific node type has different tools for different audiences.

\* \* \* \* \*